Patented Feb. 9, 1943

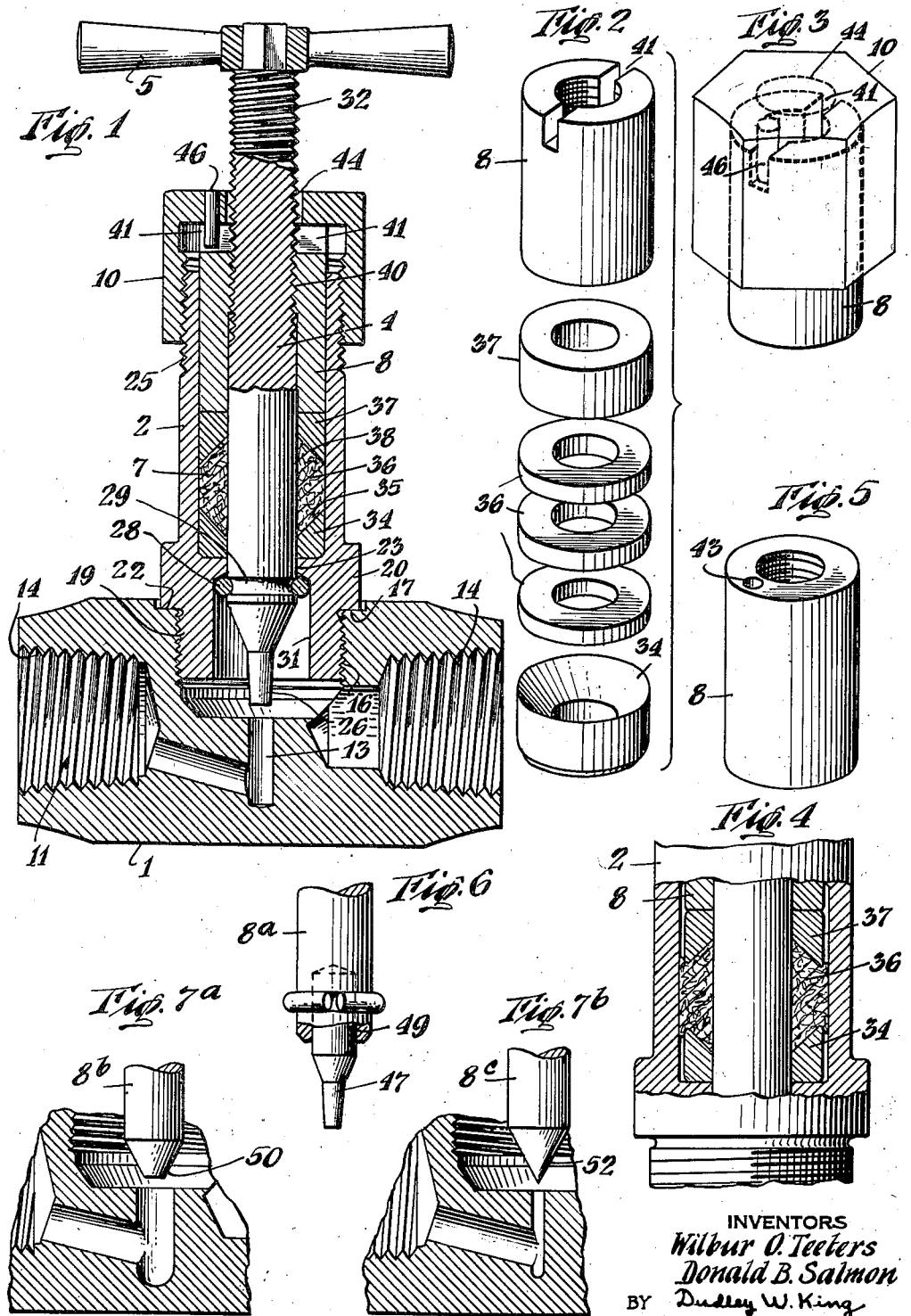

2,310,558

UNITED STATES PATENT OFFICE 2,310,558

VALVE

Wilbur O. Teeters, Cresskill, N. J., and Donald B. Salmon, New York, N. Y., assignors to Hoke Incorporated, New York, N. Y., a corporation of New York Application December 16, 1939, Serial No. 309,534

10 Claims. (Cl. 251—50)

The present invention relates to valves and more particularly to a needle valve of improved construction having packing means which may be adjusted without materially disturbing a particular setting of the valve.

Constructions have been utilized previous to the present device for retaining a particular valve spindle setting while a valve packing is tightened to minimize or prevent escape of fluid through the valve and out into the atmosphere. These previous constructions are frequently objectionable due, for example, to such things as bulkiness which makes them unsuitable for use in valves of the smaller sizes, exposed parts, relatively rapid deterioration of certain parts when used with valves for controlling corrosive fluids, and manufacturing difficulties leading to consequent high selling costs of the valve.

The present invention aims to overcome or minimize the above and other disadvantages and difficulties by providing an improved valve of compact and foolproof construction, comprised of a minimum number of parts, which may be easily and inexpensively manufactured and assembled.

An object of the present invention is to provide a needle valve of improved, relatively simple and inexpensive construction.

Another object of the invention is to provide a valve having packing means which may be adjusted without materially disturbing a particular valve setting.

Another object of the invention is to provide packing means adapted to maintain the spindle of a needle valve in alignment with a valve seat and aperture.

Another object of the invention is to provide an improved type of packing means for a needle valve.

Another object of the invention is to provide a spindle and packing construction for a needle valve adapted to minimize corrosion of the spindle adjusting means.

A further object of the invention is to provide a valve having improved means for simultaneously retaining the parts in assembled relation and adjusting a packing means.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawing, forming a part of the specification, wherein Fig. 1 is a sectional view illustrating a preferred embodiment of the invention;

Fig. 2 is an exploded perspective view of a packing means and a means for controlling the packing means;

Fig. 3 is a perspective view illustrating a spindle gland and packing nut;

Fig. 4 is an enlarged fragmentary view illustrating the packing means in a needle valve;

Fig. 5 is a perspective view illustrating a modified form of spindle gland;

Fig. 6 is a fragmentary sectional view illustrating a modified form of valve spindle; and Figs. 7a and 7b are fragmentary sectional views illustrating further modified forms of spindles and spindle seats.

Referring again to the drawing and more particularly to Figs. 1 to 4 thereof, there is illustrated a valve body 1, a housing 2, a needle or spindle 4 with a handwheel 5 secured thereto, packing means 7, a spindle thread gland 8 and a packing nut 10. These parts will now be described in detail in the order named.

The body 1 preferably is made from a single piece of material having an opening 11 therethrough for guiding a fluid, a valve seat and opening 13, and threaded portions 14 adjacent each end of the body to allow connection with a pipeline or the like (not shown). At one side thereof the body 1 has a screw threaded opening 16, preferably surrounded by a carefully machined seat 17, for receiving the lower end of the housing 2 which contains the parts that operate to control passage of fluid through the valve seat opening 13.

The housing 2 comprises a substantially tubular member having a threaded lower part 19 for engaging with the threaded opening 16 in the side of the valve body 1 to hold these two parts together. Also the housing preferably has an enlarged portion 20 above its threaded lower part provided with a carefully machined seat 22 for abutting against the machined seat 17 on the body to form a tight seal which will prevent leakage of fluid between the joint of the body and housing. At the interior of and adjacent the lower part of the housing is an inwardly extending ledge or shelf 23 adapted to form both a seat for a packing means and a stop portion for limiting excessive upward movement of a valve needle or spindle. The upper part of the housing has a threaded portion 25 for receiving a capping or packing nut 10.

The relatively long needle or spindle member 4, which controls passage of fluid through the valve, extends through the center of the housing 2 into the body 1, with a lower tapered end 26 in substantial alignment with the valve body opening 13. Movement of the spindle 4 toward and away from the valve body opening 13 varies the effective size of said opening and hence controls the amount of fluid passing through the valve. In fully closed position the tapered portion 26 on the spindle fits within the valve body aperture 13 to cut off flow of any fluid through the valve. Excessive upward movement of the spindle may be prevented by a retaining ring 28, formed of spring steel or the like, snapped into and carried by a groove 29 adjacent the lower part of the spindle. Contact of the retaining ring 28 with the underside of the inwardly extending housing ledge 23 limits upward movement of the spindle. The retaining ring can not become separated from the spindle groove 29 because the lower internal side walls 31 of the housing 2 prevent spreading of the retaining ring and consequent separation from the spindle groove 29. The lower part of the spindle above the retaining ring groove 29 has a smooth surface for forming a seat or bearing with a packing means. The upper part of the spindle is provided with a threaded portion 32, the number of threads per unit of length thereon being the same as that of the threaded portion 25 at the upper part of the housing 2, the reason for which will be explained hereinafter. A handwheel 5 may be suitably attached to the upper end of the spindle 4 to facilitate rotation and adjustment of it.

Leakage of fluid from the valve body 1 up along the spindle 4 is prevented or minimized by a packing means 7 surrounding the spindle and carried on the inwardly extending ledge 23 adjacent the lower part of the housing. This location of the packing means adjacent the lower part of the housing is an important feature for it insures against corrosive liquids or gases coming into contact with the spindle threads 32 to destroy them. The packing means comprises a lower annular packing gland 34 with an inwardly tapered or inclined upper surface 35, a compressible packing of suitable material or a gasket 36 resting against said tapered upper surface and an upper annular packing gland 37 with an inwardly tapered or inclined lower surface 38 resting against the upper end of the packing material 36. The upper and lower packing glands 37 and 34 preferably fit relatively closely about the smooth spindle 4 but comparatively loosely at their outer peripheries with the interior walls of the housing 2; Fig. 4 shows this in enlarged and slightly exaggerated form. This construction has been found to compress a gasket or packing material more uniformly or evenly about the spindle when the glands move toward each other. While a single annular gasket or ring of packing material 36 may be utilized between the upper and lower packing glands 37 and 34, it has been found that a plurality of separate gaskets, for example three (Fig. 2), give satisfactory results in actual practice. Relative movement of the lower and upper packing glands 34 and 37 toward each other compresses the packing material firmly against the smooth lower portion of the spindle 4 and also against the adjacent wall of the housing 2. Due to the inward tapers on the lower and upper packing glands the packing material 36 is pressed against the spindle surface over a relatively large area and also a large component of the force tending to move the glands together is directed toward pressing the packing material against the spindle; thus leakage of fluid along the spindle, where it is most likely to occur, will be completely prevented or minimized.

In addition to minimizing leakage the present packing means 7 performs another important function, namely that of tending to maintain the center position of the spindle 4 and its alignment with the body seat aperture 13, to thus decrease wear on the valve seat and on the spindle taper 26. This will be further referred to in connection with the description of the spindle thread gland 8.

For performing the dual function of controlling the packing means 7 and carrying the spindle 4 there is utilized an annular spindle thread gland 8 having an internally threaded upper part 40 adapted to receive the threads 32 on the upper part of the spindle 4. The spindle thread gland 8 normally rests against the upper packing gland 37 and downward movement of it compresses the packing material 36 against the spindle. Rotation of the spindle 4 causes upward or downward movement of it with respect to the body seat aperture 13 and with respect to the normally stationary spindle thread gland 8 which carries the spindle. The spindle thread gland 8 preferably has a slot 41 (Figs. 1 to 3) or other recess 43 (Fig. 5) therein adjacent its upper end to facilitate rotation and movement of it together with an exteriorly located packing nut 10 which is secured to the threaded portion 25 at the upper outer part of the housing 2.

The outer periphery of the spindle thread gland 8, like the outer peripheries of the upper and lower packing glands 37 and 34, preferably fits comparatively loosely with respect to the interior walls of the housing 2, as shown in the enlarged and slightly exaggerated form of Fig. 4. The axis of the valve spindle 4 is hence not rigidly fixed with respect to the valve housing 2 or the valve body 1 but is permitted to move laterally slightly. Due to the elasticity or compressibility of the packing material used, the spindle may take advantage of this freedom of motion and align itself with the valve seat and opening 13 to insure effective closure whenever desired.

The packing nut 10 carried on the upper outer part of the housing 2 has an aperture 44 therein through which the upper threaded part of the spindle passes and also has an inwardly extending locking pin or projection 46 secured thereto. The locking pin fits into the slot 41 (Figs. 1 to 3) or other recess 43 (Fig. 5) of the spindle thread gland to lock the said gland and nut together so that rotation of the nut produces a corresponding rotation of the gland. The perspective view of Fig. 3 clearly illustrates the features of the spindle thread gland 8, packing nut 10, locking pin 46, and the normal relative positions of these parts in a valve. If the packing nut 10 is rotated downwardly or upwardly from the position shown in Fig. 1 the spindle thread gland 8 will likewise be rotated downwardly or upwardly. Since the threaded portions on the housing 2 and packing nut 10 and on the spindle 4 and spindle thread gland 8 have the same number of threads per unit of length, the packing nut may be rotated to adjust the packing means without materially disturbing a particular spindle setting; also, this tends to minimize any possible jamming or binding as the packing nut and spindle thread gland are rotated. While the projection 46 has been described as on the locking nut and the recess 41 as in the spindle thread gland, it will be clear that the recess could be in the locking nut and the projection on the spindle thread gland.

During assembling operations the retaining ring may be first snapped into the spindle groove 29 and the spindle then passed upwardly into the housing from the lower part thereof; the housing may thereupon be screwed into the body, and the remaining parts easily assembled with the housing or spindle. Or, if desired, the housing and parts may be assembled together and thereafter the retaining ring put on the spindle, the spindle screwed back into the housing and the housing and parts assembled with the body.

Figs. 6, 7a and 7b each illustrate modified types of spindles which may be used with the preferred embodiment. In Fig. 6 the spindle has a replaceable tapered point 47 which is force-fitted into an aperture 49 in the main body of the spindle 8a. The spindle 8b of Fig. 7a has a blunt end 50 for use with large seat openings for allowing full flow, and the spindle 8c of Fig. 7b has a sharp V point 52 for use with a small seat opening to permit accurate control of small flows. These particular types of spindles are not claimed in the present construction, and it is to be understood that the construction is not limited to use only with the spindles shown.

The operation of the valve described above will be understood by referring more particularly to Fig. 1 of the drawing. For example, assume that it is desired to tighten the packing about the spindle without disturbing the particular valve setting. A wrench applied to the packing nut 10 to rotate it downwardly causes the spindle thread gland 8 also to rotate with the packing nut and move downwardly. The downward movement of the spindle thread gland 8 is transmitted directly to the upper packing gland 37 of the packing means and packing 36 immediately compressed against the spindle 4 and wall of the housing 2. Movement of the spindle 4 during tightening of the packing is greatly minimized or entirely prevented, for the tighter the packing is compressed, the more firmly the spindle is gripped by the packing. The packing may thus be tightened without materially disturbing a particular valve setting.

It will be seen that the present invention provides a new and improved needle valve which allows tightening of a packing means about a valve spindle while simultaneously retaining a desired setting of the spindle. The construction is compact, may be manufactured at a cost which is not prohibitive and may be assembled with a minimum amount of effort. In addition, the valve is simple in construction, easy to adjust and operate, and fully capable of withstanding any rough usage to which it may be subjected.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described our invention, we claim:

1. A valve of the class described, comprising, in combination, a body having an aperture therein for guiding the passage of a fluid, a housing secured to said body for containing fluid controlling means, a member in said housing adapted to be moved to control the effective size of the aperture in said body and the passage of fluid therethrough, means on said member for adjustably supporting said member, packing extending about said controlling member adapted to minimize passage of fluid along said member, a second member in said housing having means thereon adapted to cooperate with the controlling member supporting means to adjustably support the controlling member, a packing nut adjustably secured to said housing, and a locking projection securing said packing nut to said second member whereby movement of said packing nut causes movement of said second member which may be effective to regulate the packing.

2. Means cooperating with a valve spindle and housing to retain a desired setting of the spindle while regulating a packing about the spindle, comprising, in combination, a spindle having a threaded portion thereon, a member extending about said spindle having a threaded portion thereon adapted to cooperate with the threaded portion on said spindle to adjustably support the spindle and having a projection receiving recess therein, and a packing nut adjustably secured to said housing having a projection thereon extending into the recess in said spindle supporting member, movement of said packing nut being effective to move said spindle supporting member to regulate the packing while retaining the setting of said spindle.

3. A valve comprising, in combination, a body having an aperture for permitting passage of fluid therethrough, a housing secured to said body for containing a fluid controlling spindle, a fluid controlling spindle in said housing having a screw thread thereon adjacent its upper portion, packing means carried in said housing adjacent the lower part thereof comprising a pair of spaced inwardly inclined annular members extending about the spindle and a packing material retained intermediate said spaced members, an annular packing compressing and spindle supporting member in said housing adjacent the upper portion thereof having a screw thread therein cooperating with the screw thread on said spindle to adjustably support the spindle and having a recess therein, and means adjustably secured to the upper portion of said housing having a projection thereon adapted to fit into the recess of said annular packing compressing and spindle supporting member to facilitate rotation thereof with said latter means and adjustment of the packing material without materially affecting a particular spindle setting.

4. A valve comprising, in combination, a body having an aperture for permitting passage of fluid therethrough, a housing secured to said body for containing a fluid controlling spindle, a fluid controlling spindle in said housing having a relatively smooth lower portion and a screw threaded upper portion, packing means comprising a pair of spaced inwardly tapered annular members with a packing material intermediate them extending about the relatively smooth lower portion of said spindle and carried in said housing at the lower part thereof, an annular packing compressing and spindle supporting member in said housing adjacent the upper portion thereof having a screw threaded interior portion cooperating with the screw threaded upper portion of said spindle to adjustably support the spindle and having a recess therein, and means adjustably secured to the upper portion of said housing having a locking pin thereon adapted to fit into the recess of said annular packing compressing and spindle supporting member to facilitate rotation thereof with said latter means and adjustment of the packing material without materially affecting a particular spindle setting.

5. The combination with a needle valve having a spindle and a housing of a spindle supporting member extending about said spindle and spaced from the wall of said housing so as to permit limited lateral movement of said member and spindle, packing means comprising an annular member extending about said spindle below said supporting member having an upwardly facing inclined packing seat, a second annular member extending about said spindle below said supporting member having a downwardly facing inclined packing seat, and a packing gasket extending about the spindle intermediate said annular members, each of said annular members fitting relatively closely about the spindle and relatively loosely with respect to the wall of said housing to facilitate uniform adjustment of the packing material and being adapted upon relative movement toward each other to compress said packing material between the spindle and housing, and each of said annular members being free to move sidewise with the spindle to facilitate alignment of the spindle with a valve body aperture.

6. Means cooperating with a valve spindle and housing adapted to facilitate alignment of the spindle with a valve opening, comprising, in combination, a spindle having a threaded portion thereon, a member extending about said spindle having a threaded portion cooperating with the threaded portion on said spindle to adjustably support the spindle and having a relatively loose fit with respect to said housing, and packing means in said housing below said supporting member, the relatively loose fit of said supporting member with respect to said housing allowing limited lateral movement of the spindle.

7. Means cooperating with a valve spindle and housing adapted to facilitate alignment of the spindle with a valve opening, comprising, in combination, a spindle having a threaded portion thereon, a member extending about said spindle having a threaded portion cooperating with the threaded portion on said spindle to adjustably support the spindle and having a relatively loose fit with respect to said housing, and packing means extending about said spindle below said supporting member, comprising a compressible packing material and an annular packing member adapted to compress the packing against the spindle, said annular member having a relatively loose fit with respect to said housing, the relatively loose fit of said supporting member and annular member with respect to said housing allowing limited lateral movement of the spindle.

8. In or for a valve, means adapted to cooperate with a valve spindle and housing to facilitate adjustment of a packing and to minimize longitudinal movement of the spindle during said adjustment, comprising, a spindle supporting member mounted within said housing and extending about said spindle and rotatable with respect to the housing, and a packing nut secured to the housing and operatively connected with said spindle supporting member so that rotation of the packing nut causes corresponding rotation of the spindle supporting member within said housing and adjustment of a packing therein.

9. The combination with a valve having a spindle and housing of spaced upper and lower packing compressing members each fitting closely about the spindle and relatively loosely with respect to the wall of said housing and adapted to compress a packing material extending about the spindle intermediate said members, and a spindle supporting member above said upper packing compressing member also having a relatively loose fit with respect to the wall of said housing, the said loose fits of the supporting member and packing compressing members with respect to the housing wall allowing lateral movement of the spindle.

10. The combination with a valve having a spindle and housing of, a vertically adjustable spindle supporting and packing compressing member, a packing nut adjustably secured to said housing, means securing said spindle supporting member and packing nut together whereby rotation of said packing nut effects rotation of said spindle supporting member and facilitates vertical adjustment of the spindle supporting member, said spindle supporting member having a relatively close fit about the spindle and having a relatively loose fit with respect to said housing to provide a clearance sufficient to allow limited lateral movement of the spindle so as to facilitate alignment thereof with a valve body aperture.

WILBUR O. TEETERS.
DONALD B. SALMON